(12) United States Patent
Gutierrez et al.

(10) Patent No.: US 12,180,714 B2
(45) Date of Patent: Dec. 31, 2024

(54) INTEGRATED ROOF SYSTEM WITH ENGINEERED WOOD

(71) Applicant: LOUISIANA-PACIFIC CORPORATION, Nashville, TN (US)

(72) Inventors: Sarath Vega Gutierrez, Nashville, TN (US); Jarrod Kevin Line, Brentwood, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 17/068,712

(22) Filed: Oct. 12, 2020

(65) Prior Publication Data

US 2021/0108417 A1    Apr. 15, 2021

Related U.S. Application Data

(60) Provisional application No. 62/988,849, filed on Mar. 12, 2020, provisional application No. 62/962,240, (Continued)

(51) Int. Cl.
| | | |
|---|---|---|
| *E04D 3/35* | (2006.01) | |
| *E04D 3/34* | (2006.01) | |
| *E04D 3/38* | (2006.01) | |

(52) U.S. Cl.
CPC ............... *E04D 3/35* (2013.01); *E04D 3/34* (2013.01); *E04D 3/38* (2013.01)

(58) Field of Classification Search
CPC .... E04D 3/35; E04D 3/34; E04D 3/38; B32B 21/02; B32B 2419/06
(Continued)

(56) References Cited

U.S. PATENT DOCUMENTS 2,447,272 A * 8/1948 Parkes ............... E04B 1/76
                                            52/578
4,717,614 A   5/1988 Bondoc et al.
(Continued)

FOREIGN PATENT DOCUMENTS

EP    3342949 A1    7/2018
FR    3065740 A1    11/2018
(Continued)

OTHER PUBLICATIONS

International Search Report and Written Opinion, PCT/US2020/055283, Louisiana-Pacific Corporation, international filing date Oct. 12, 2020.
(Continued)

*Primary Examiner* — Brian E Glessner
*Assistant Examiner* — Adam G Barlow
(74) *Attorney, Agent, or Firm* — Wayne Edward Ramage; Baker Donelson

(57) ABSTRACT

A multi-layered integrated roofing plank or panel with a base layer comprising engineered or manufactured wood, a water resistant barrier layer covering at least the outer face of the base layer, and at least one of the edges of the base layer. A texturizing material also may be affixed to, or integrated with, the water resistant barrier layer. The edges of the roofing plank or panel may be configured as part of a joint with adjacent planks or panels, including, but not limited to, shiplap joints, tongue-and-groove joints, bead-and-cove joints, butt joints, or combinations or variations thereof.

19 Claims, 14 Drawing Sheets

Related U.S. Application Data filed on Jan. 17, 2020, provisional application No. 62/914,306, filed on Oct. 11, 2019.

(58) Field of Classification Search
USPC .......................................... 52/519, 540, 591.4
See application file for complete search history.

(56) References Cited

U.S. PATENT DOCUMENTS

| | | | |
|---|---|---|---|
| 4,897,291 A | 1/1990 | Moon | |
| 4,932,184 A * | 6/1990 | Waller | E04D 3/24 |
| | | | 52/542 |
| 5,165,816 A | 11/1992 | Parasin | |
| 5,251,416 A * | 10/1993 | White | E04D 5/143 |
| | | | 52/459 |
| 6,491,579 B1 | 12/2002 | O'Hagin | |
| 6,772,569 B2 | 8/2004 | Bennett et al. | |
| 7,442,658 B2 * | 10/2008 | Rodrigues | B32B 27/06 |
| | | | 442/180 |
| 7,452,598 B2 * | 11/2008 | Shiao | E04D 5/12 |
| | | | 428/407 |
| 8,590,267 B2 | 11/2013 | Manville | |
| 9,255,406 B1 | 2/2016 | McCary, Sr. | |
| 9,314,994 B2 | 4/2016 | Strait | |
| 9,702,140 B2 | 7/2017 | Bennett et al. | |
| 10,072,415 B2 | 9/2018 | Bennett et al. | |
| 10,385,566 B2 | 8/2019 | Carlson | |
| 10,711,453 B1 * | 7/2020 | Jordan | E04C 2/246 |
| 10,927,542 B2 * | 2/2021 | St. Germain | E04B 1/68 |
| 10,982,441 B2 * | 4/2021 | Chevillard | E04C 1/40 |
| 11,118,354 B2 * | 9/2021 | Tang | E04D 13/002 |
| 2004/0055240 A1 * | 3/2004 | Kiik | B32B 5/26 |
| | | | 52/545 |
| 2007/0166454 A1 | 7/2007 | Gupta | |
| 2008/0110103 A1 * | 5/2008 | Fontecchio | E04D 7/005 |
| | | | 52/24 |
| 2010/0028690 A1 * | 2/2010 | Parks | C09D 7/61 |
| | | | 206/568 |
| 2010/0227103 A1 | 9/2010 | Hohmann, Jr. | |
| 2011/0265416 A1 * | 11/2011 | Southwell | E04F 13/04 |
| | | | 52/515 |
| 2012/0036705 A1 * | 2/2012 | Gehris | B25H 1/02 |
| | | | 29/559 |
| 2012/0266553 A1 | 10/2012 | Shiao et al. | |
| 2012/0288678 A1 * | 11/2012 | Grube | B32B 11/10 |
| | | | 428/150 |
| 2013/0180198 A1 | 7/2013 | Olson et al. | |
| 2014/0120301 A1 | 5/2014 | Jordan et al. | |
| 2016/0168864 A1 * | 6/2016 | Ramachandra | E04F 15/10 |
| | | | 52/588.1 |
| 2016/0281352 A1 | 9/2016 | Bennett et al. | |
| 2016/0369506 A1 | 12/2016 | Bennett et al. | |
| 2017/0260748 A1 * | 9/2017 | Buhrman | E04D 3/35 |
| 2018/0037751 A1 | 2/2018 | Lu | |
| 2018/0320390 A1 | 11/2018 | St. Germain | |
| 2019/0153721 A1 | 5/2019 | St. Germain | |
| 2019/0316352 A1 | 10/2019 | Brooks, III | |
| 2020/0139663 A1 * | 5/2020 | Sweet | B32B 15/085 |
| 2021/0246656 A1 * | 8/2021 | St. Germain | E04F 13/04 |
| 2021/0323343 A1 * | 10/2021 | Braun | B44C 1/24 |

FOREIGN PATENT DOCUMENTS

| | | |
|---|---|---|
| JP | H07109804 A | 4/1995 |
| WO | WO03091508 A1 | 11/2003 |

OTHER PUBLICATIONS

International Search Report and Written Opinion, PCT/US2021/022234, Louisiana-Pacific Corporation, international filing date Mar. 12, 2021.

International Search Report and Written Opinion, PCT/US2021/060777, Louisiana-Pacific Corporation, international filing date Nov. 24, 2021.

International Search Report and Written Opinion, PCT/US2022/018526, Louisiana-Pacific Corporation, international filing date Mar. 2, 2022.

International Search Report and Written Opinion, PCT/US2022/036219, Louisiana-Pacific Corporation, international filing date Jul. 6, 2022.

Insulforam: "Insulroof Insulvent—Vented Nailbase Insulations," Sep. 30, 2014, pp. 1-2, XP055895378.

Anonymous, "Focus on Ventilation," Roofing Contractor, Jan. 8, 2013, pp. 1-5, XP055895385.

* cited by examiner

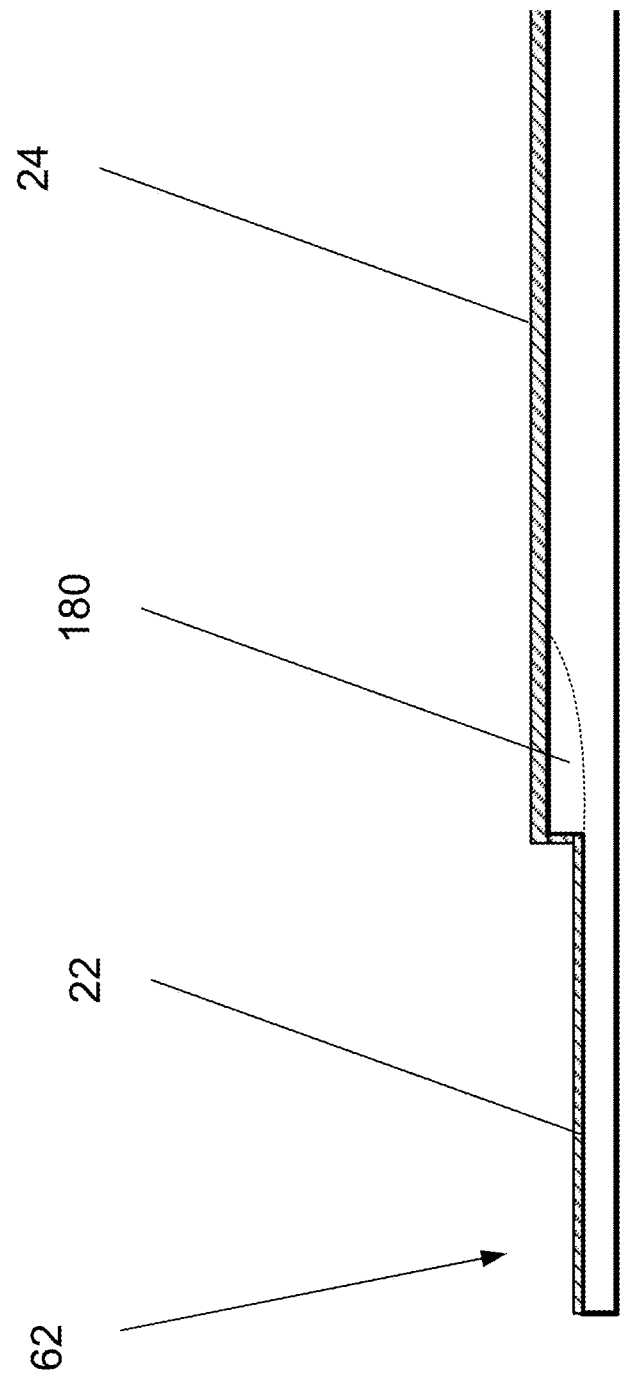

INTEGRATED ROOF SYSTEM WITH ENGINEERED WOOD

This invention claims benefit of and priority to U.S. Provisional App. No. 62/914,306, filed Oct. 11, 2019, App. No. 62/962,240, filed Jan. 17, 2020, and App. No. 62/988,849, filed Mar. 12, 2020, all of which are incorporated herein by specific reference in their entireties for all purposes.

FIELD OF INVENTION

This invention relates to a multi-layered engineered structural plank or panel (which can be wood-based, such as oriented-strand board, plywood, or other lignocellulosic-based panel) used for integrated roofing sheathing.

BACKGROUND OF THE INVENTION

Current roof assemblies are typically multiple layers of several materials, each performing a single function, that are installed separately on the site in which the building is being constructed. In many roofing systems, there is a deck, an underlayment barrier on top of the deck, covered by a surface layer of shingles (e.g., asphalt, ceramic, metal, and the like). Compatibility between the various layers creates challenges not only for the designer, but also for the installers. In addition, a varied and large amount of materials are required during the installation, as well as during maintenance (e.g., re-roofing).

A central layer in most such assembles in a wood panel product, or an integral composite engineered panel product, including, but not limited to, engineered wood composite products formed of lignocellulosic strands or wafers (sometimes referred to as oriented-strand board, or OSB). Products such as fiberboard and particleboard have been found to be acceptable alternatives in most cases to natural wood paneling, sheathing and decking lumber. Fiberboard and particleboard are produced from wood particles bonded together by an adhesive, the adhesive being selected according to the intended use of and the properties desired for the lumber. Often times, the adhesive is combined with other additives to impart additional properties to the lumber. Additives can include, but are not limited to, fire retardants, insect repellants, moisture resistant substances, fungicides and fungal resistant substances, and color dyes. A significant advantage of fiberboard and particleboard lumber products is that they have many of the properties of plywood, but can be made from lower grade wood species and waste from other wood product production, and can be formed into lumber in lengths and widths independent of size of the harvested timber.

A major reason for increased presence in the marketplace of the above-described product alternatives to natural solid wood lumber is that these materials exhibit properties like those of the equivalent natural solid wood lumber, especially, the properties of retaining strength, durability, stability and finish under exposure to expected environmental and use conditions. A class of alternative products are multilayer oriented wood strand boards, particularly those with a layer-to-layer oriented strand pattern, such as OSB. Oriented, multilayer wood strand boards are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type, and examples of processes for pressing and production thereof, are described in detail in U.S. Pat. Nos. 3,164,511, 4,364,984, 5,435,976, 5,470,631, 5,525,394, 5,718,786, and 6,461,743, all of which are incorporated herein in their entireties by specific reference for all purposes.

BRIEF DESCRIPTION OF THE DRAWINGS

FIG. 14 shows a side section view of a roofing plank or panel with drainage channels.

DETAILED DESCRIPTION OF EXEMPLARY EMBODIMENTS

Figure 1:
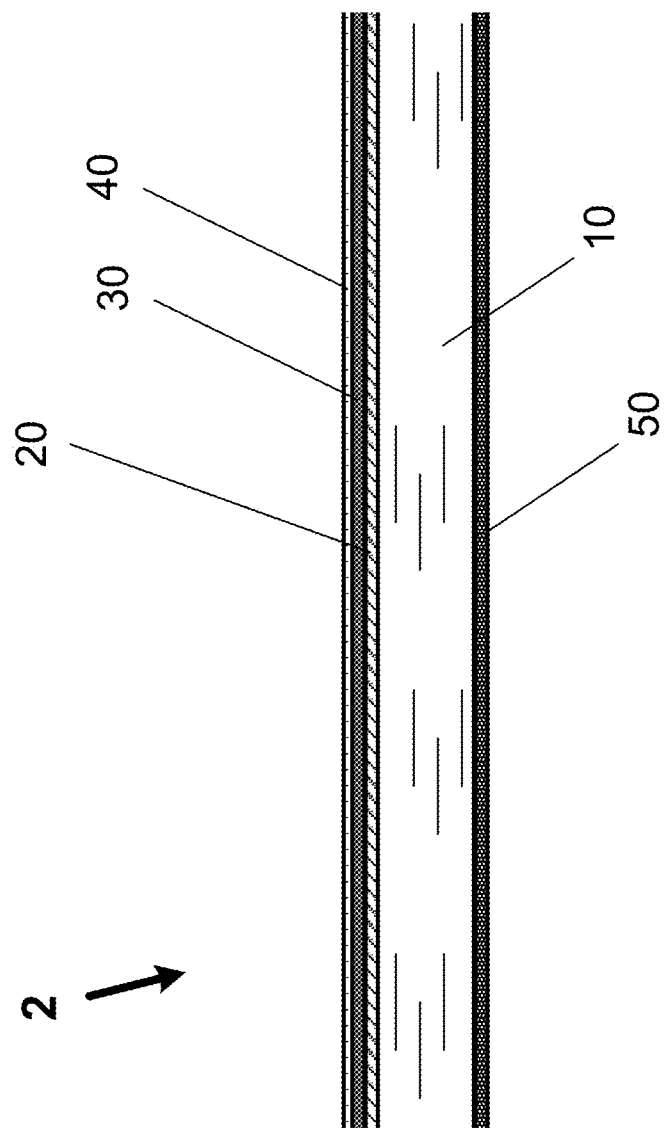
FIG. 1 shows a sectional view of a roofing panel or plank in accordance with an embodiment of the present invention.
Figure 2:
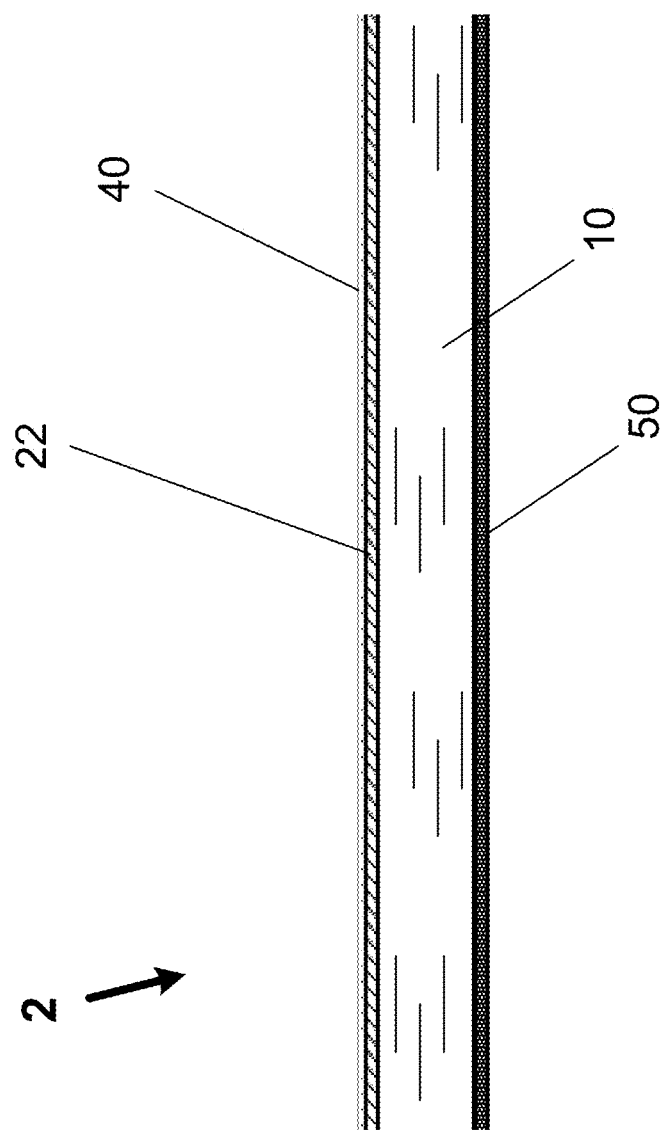
FIG. 2 shows a sectional view of an alternative embodiment of a roofing panel or plank in accordance with another embodiment of the present invention.

In various exemplary embodiments, as seen in FIGS. 1-2, the present invention comprises a multi-layer panel or plank 2 for use as integrated structural sheathing on a roof. In the embodiment shown, the multi-layer integrated roofing product comprises a wood structural panel or plank 10. The wood may be natural or manufactured, engineered wood, such as oriented strand board (OSB) or plywood. The panel may be coated or treated, during or after the manufacturing process, with a product that provides various properties, such as, but not limited to, weather resistance, fungus resistance, insect resistance, and/or fire resistance. The treatment may be integrated with the material forming the wood structural panel, or may be a coating on one or both surfaces.

In the embodiment shown, a weather or water resistive barrier (WRB) 20 of some kind is applied to the upper or outward facing surface of the panel 10, effectively serving as an underlayment. The WRB may be a form of paper overlay, a form of spray-applied or fluid-applied polymer or material (such as silicone), or other form of WRB. In some embodiments, the WRB may include a granular or solid material 40 as a texturizing aggregate or material (such as, but not limited to, ceramic coated granules, clay, rock, glass, slate, styrene, particles of polymeric plastic, or combinations thereof) as a component or part of the WRB itself (e.g., texturizing aggregate or material may be mixed with a liquid polymer WRB). Alternatively, the granular or solid material 40 may be subsequently applied directly to the WRB after the WRB is applied to the plank/panel. In yet a further embodiment, the outer surface of the WRB may be coated with a polymer, adhesive and/or asphalt 30, which is turn is coated with the granular or solid material 40. In some embodiments, the adhesive and/or asphalt may include the granular or solid material as a component or part (e.g., texturizing aggregate or material may be mixed with the adhesive and/or asphalt).

The invention thus effectively combines a structural sheathing panel, WRB layer or polymer, and texturizing aggregates or materials, if present (e.g., surface layer, e.g., shingles, metals, or other roof surface materials), as separately applied in the prior art, into one multi-layer panel product, which is less reliant on skilled labor for installation at a job site and reduces installation time by eliminating the separate sequential application of a WRB system and a surface layer in the installation process. As discussed above, in some embodiments, the WRB may be a separate layer, or it may be integrated with the texturizing aggregate/surface layer.

In several embodiments, the texturizing aggregate or top surface layer may be one or more flexible rolls of material, which may be applied by unrolling the material across the panel during manufacture (or, in some embodiments, at the job site). The roll may have a self-adhesive layer on one side. In one embodiment, the surface layer rolls may comprise one or more rolls of one-sided or two-sided construction tape (i.e., with strong, permanent adhesive on one or two sides). One side of the tape adheres to the panel, while the other side contains the surface material. The tape may be applied to the panel at the factory, or otherwise prior to installation at the job site.

Figure 3:
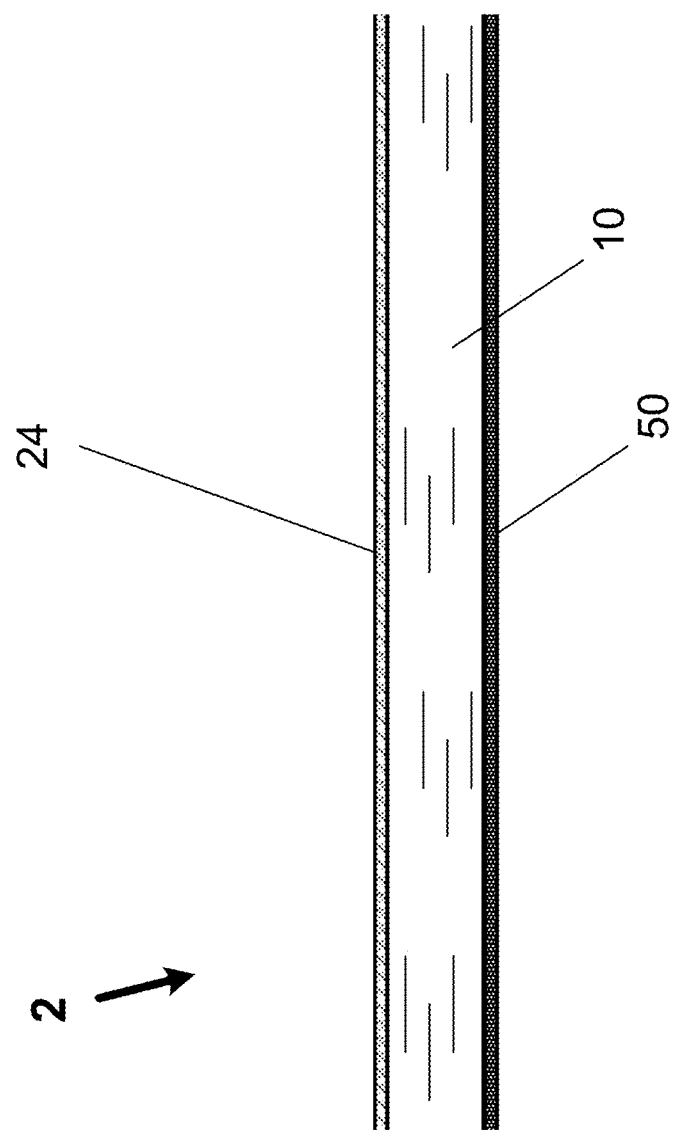
FIG. 3 shows a sectional view of an alternative embodiment of a roofing panel or plank in accordance with another embodiment of the present invention.
Figure 4:
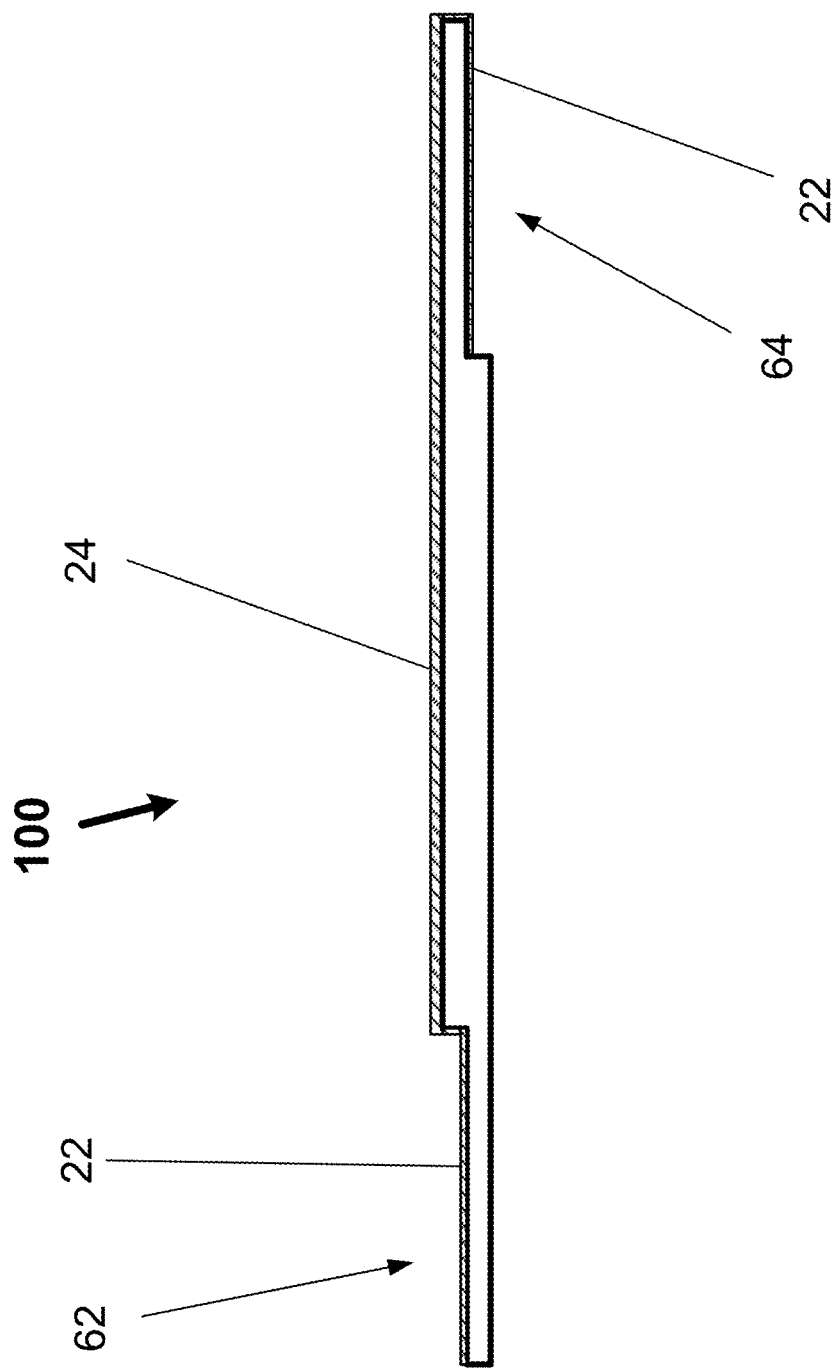
FIG. 4 shows a sectional view of an alternative embodiment of a roofing panel or plank with overlap and underlap joint sections in accordance with another embodiment of the present invention.
Figure 5:
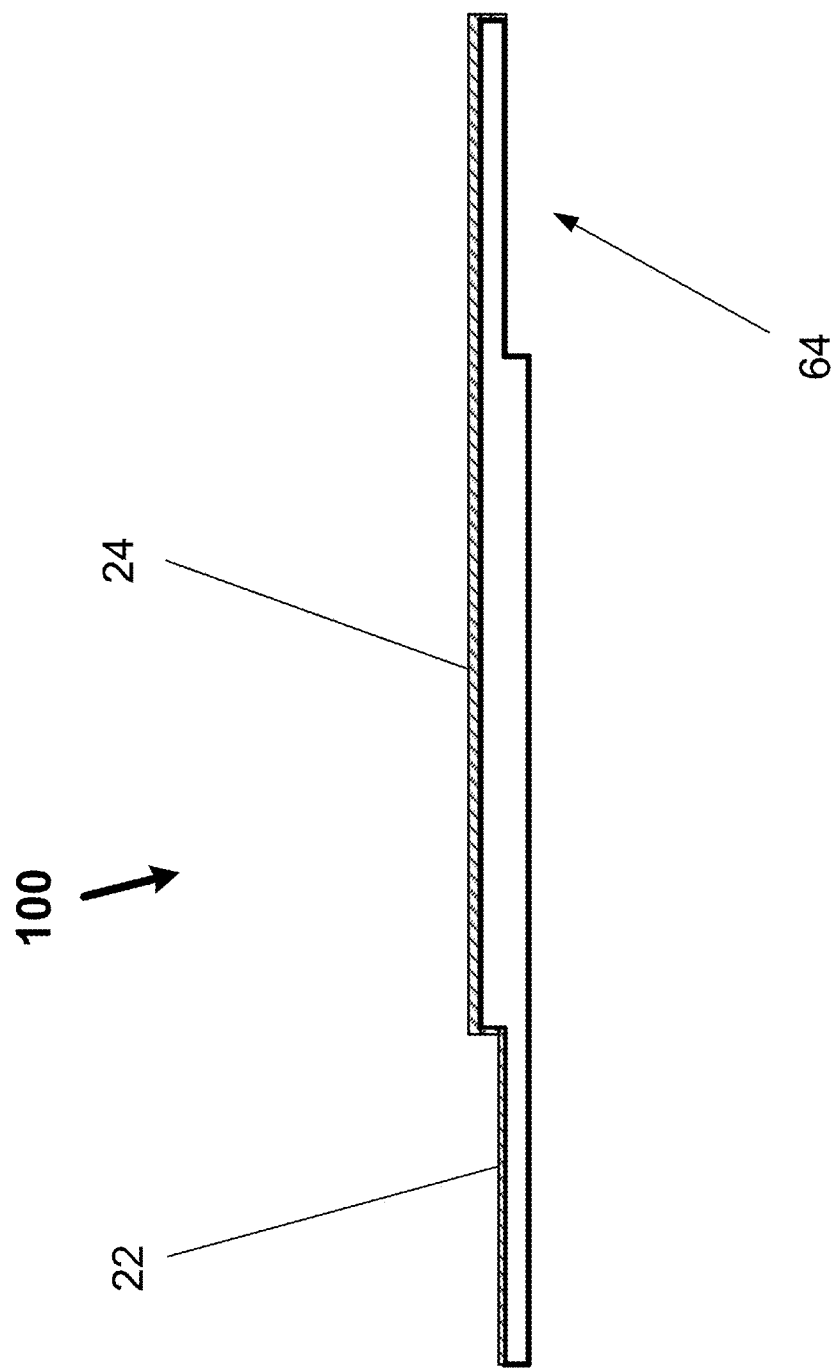
FIG. 5 shows an alternative embodiment of the roofing panel or plank of FIG. 4.

FIGS. 3-4 show an example of a standard integrated roofing panel or plank 100 with a WRB polymer layer as described above 100, with an "uphill" underlap 110 and a "downhill" overlap 120, wherein the overlap and underlap of vertically adjacent integrated roofing panels are matched to form an overlapping or shiplap joint. (Uphill and downhill are described with respect to an angled roof, with uphill being the direction towards the peak or crown of the roof, and downhill being the direction away from the peak or crown of the roof, so that water runs "downhill" and off the roof.) The standard integrated roofing panel or plank is used for the main courses (rows) of roofing planks/panels applied to a roof, with shiplap joints formed between vertically adjacent planks/panels in the courses. The right and left ends of planks/panels may be aligned with the corresponding ends of planks/panels in the vertically adjacent courses, or may be staggered or alternating. Other forms of joints may be used, such as, but not limited to, tongue-and-groove joints, bead-and-cove joints, butt joints, or combinations or variations thereof.

Some or all of the respective faces of the shiplap joint may be covered with the WRB polymer layer 22. FIGS. 4-8 shows various embodiment of a roofing plank/panel with the WRB polymer protective layer 22 (typically without texturizing granules, as contrasted to the WRB polymer protective layer with texturizing granules or other materials 24 on the outer face) extending around and over the edges, and some or all of parts of the corresponding shiplap joint sections, thereby providing greater protection to the manufactured wood (e.g., OSB) core layer 10. In some embodiments, the WRB polymer protective layer on the edges and/or shiplap joint sections may include texturizing granules or other materials.

An integrated sealant or adhesive material, such as the WRB polymer 22 or other form of sealant or adhesive, is applied to one face (or both faces) of corresponding overlap and/or underlap sections. Where the WRB polymer is used as a sealant, the two surfaces coated with the polymer are placed in contact with each other. Nails or similar fasteners used to affix the planks/panels to the roofing structure may be used in the joint area to keep the surfaces in contact (and apply a level of pressure thereto) to cause the polymer-covered surfaces to self-seal.

In an additional embodiment, the sealant comprises industrial double-sided tape 28, and extends across the width of the plank/panel (i.e., the full length of the lap section). The tape 28 is pre-applied in the factory or manufacturing facility, with the opposite side remaining covered with a liner. During installation, the installer removes the liner to form the joint between adjacent planks/panels. The double-sided tape also may be used for butt joints (or square end joints) between planks/panels.

Figure 6:
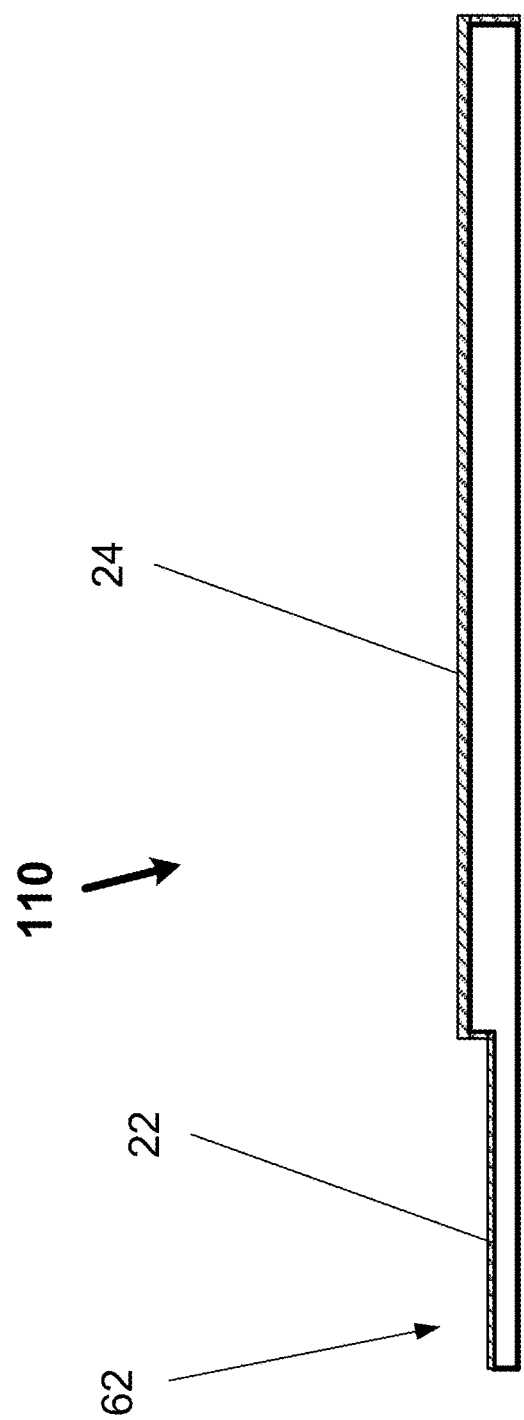
FIG. 6 shows a section view of a "starter" roofing panel or plank.
Figure 7:
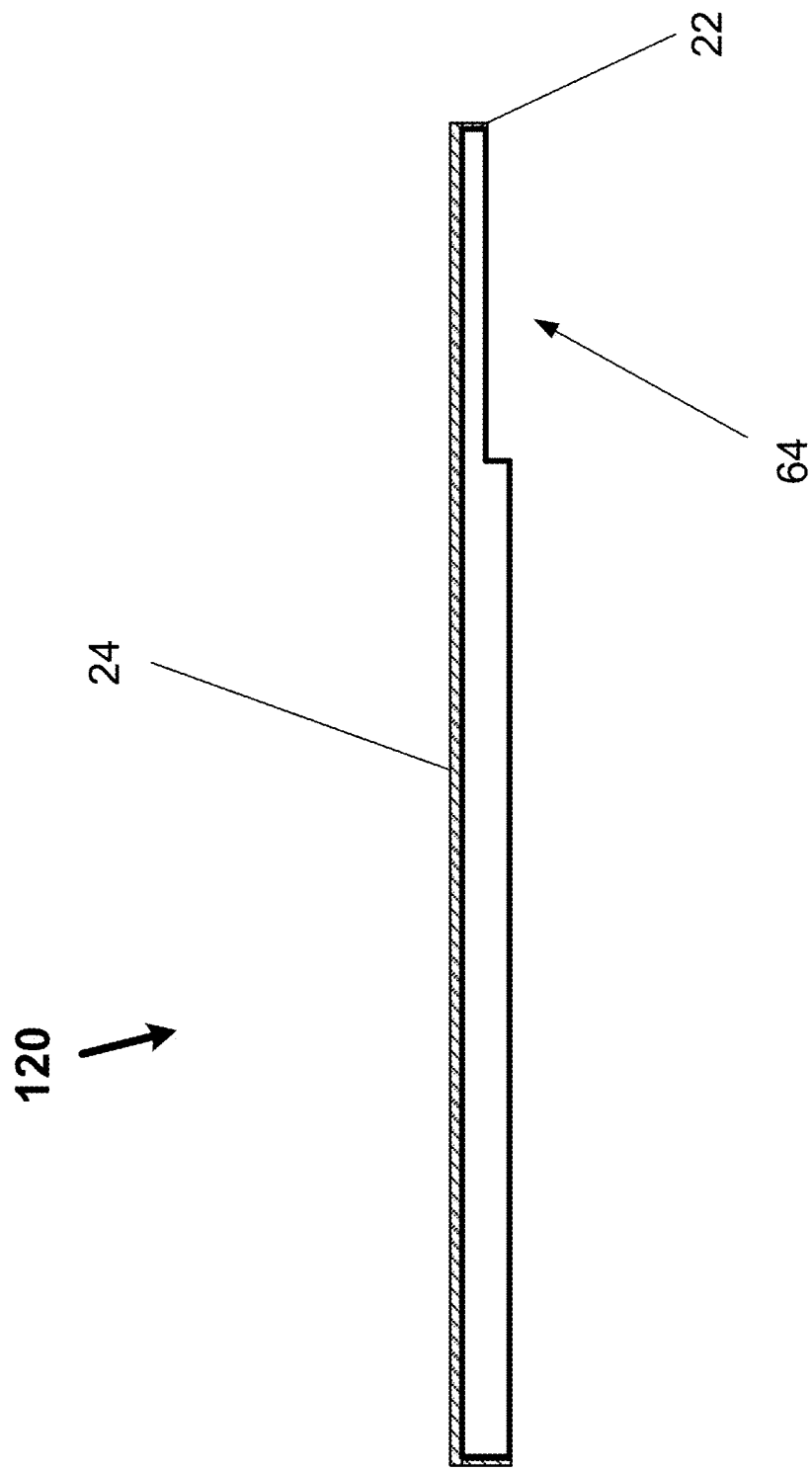
FIG. 7 shows a section view of a "crown" roofing panel or plank
Figure 8:
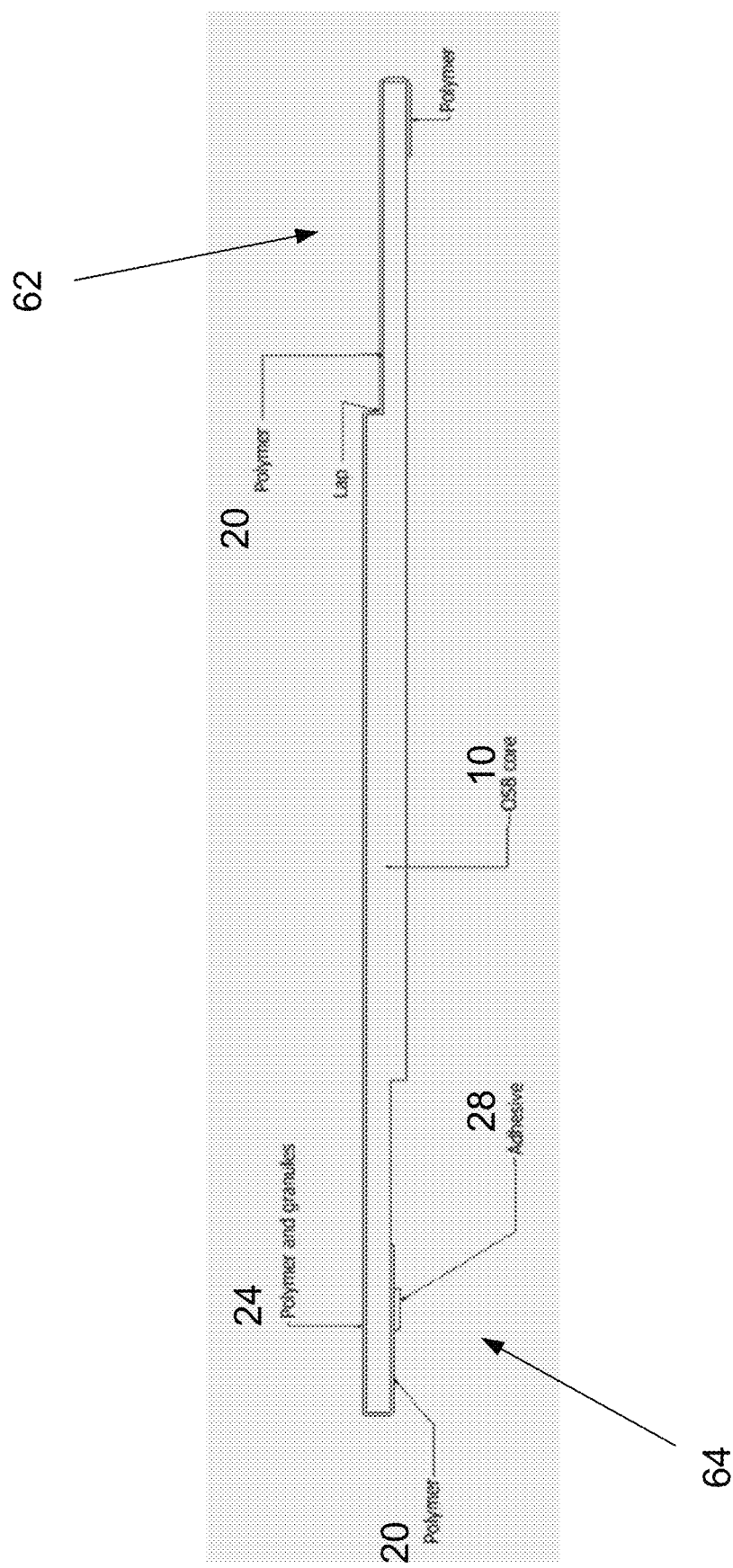
FIG. 8 shows a sectional view of an alternative embodiment of a roofing panel or plank with overlap and underlap joint sections with pre-applied double-sided tape or adhesive in accordance with another embodiment of the present invention.
Figure 9:
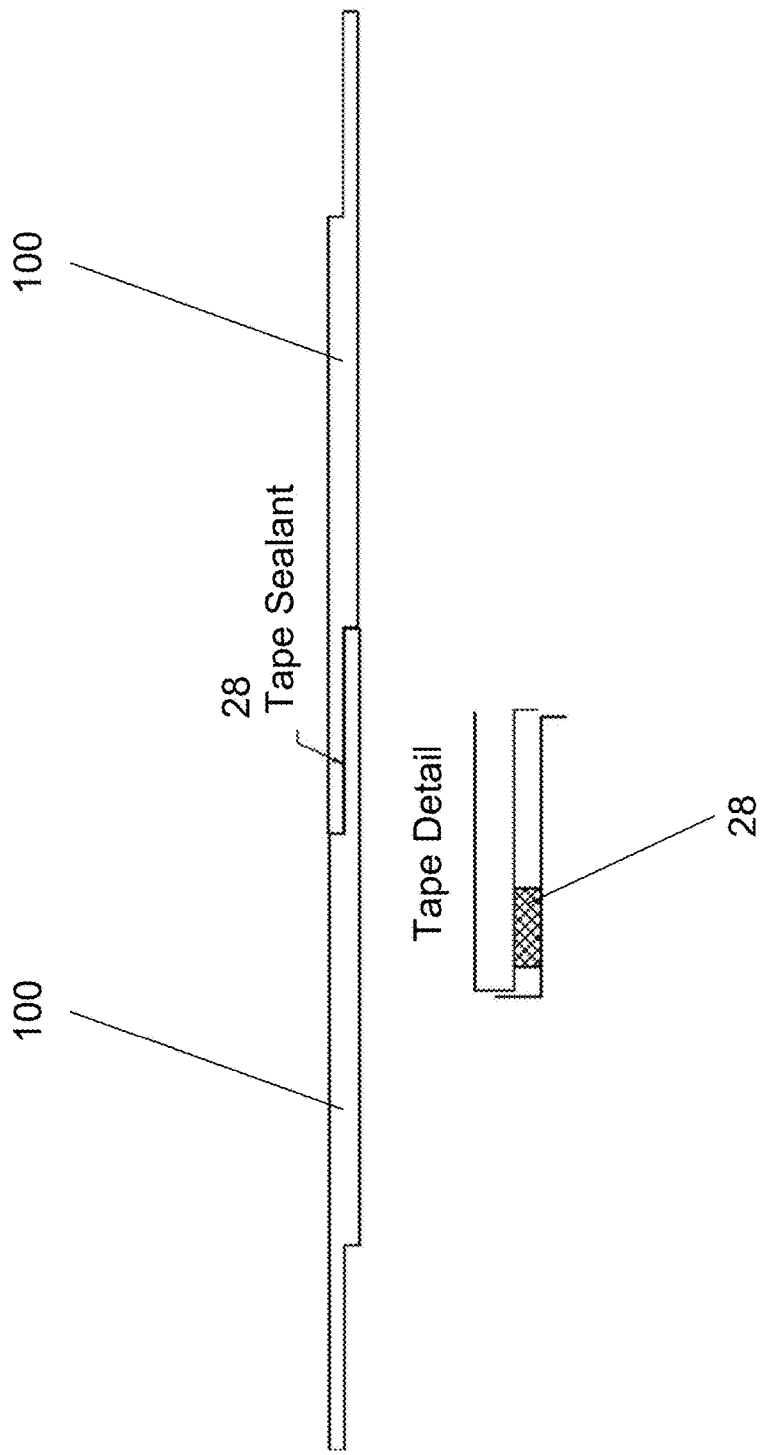
FIG. 9 shows a section view and detail of a completed shiplap joint formed with pre-applied double-sided tape between vertically adjacent roofing panels or planks.
Figure 10:
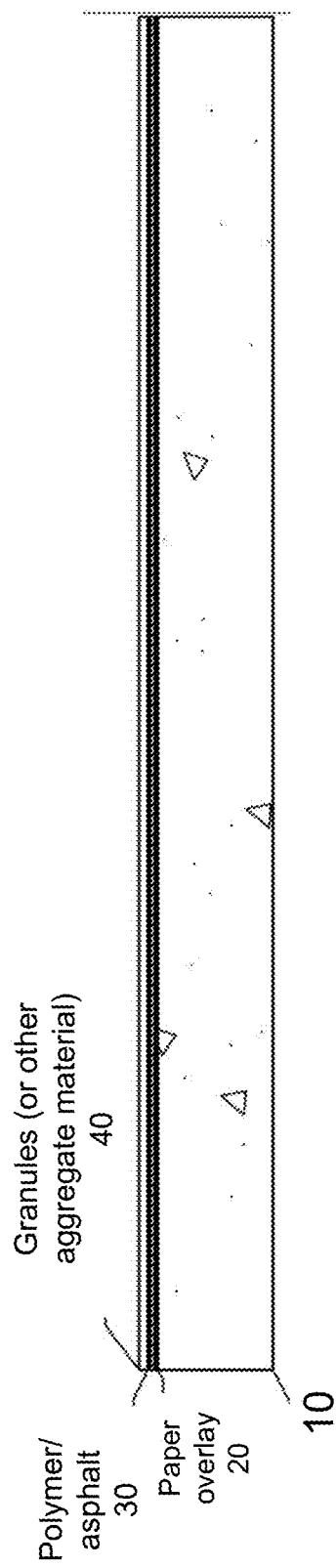
FIG. 10 shows a sectional view of an alternative embodiment of a roofing panel or plank with paper overlay in accordance with another embodiment of the present invention.

"Starter" roofing pieces 110 are shown in FIG. 6. These pieces are located along the bottom edge of the roofing, and comprise a square, butt or plain end on the "downhill" or bottom edge, while retaining the underlap 62 on the "uphill" edge to form a shiplap joint with the next adjacent course. In a similar fashion, top or crown pieces 120 are shown in FIG. 8. These pieces are located along the top edge of the roofing along the crown of the roof (which may then be covered by a roof ridge cap 150 as known in the prior art). These pieces comprise a square, butt or plain end on the "uphill" or top edge, while retaining the overlap 64 on the "downhill" edge to form a shiplap joint with the next adjacent course.

Figure 11:
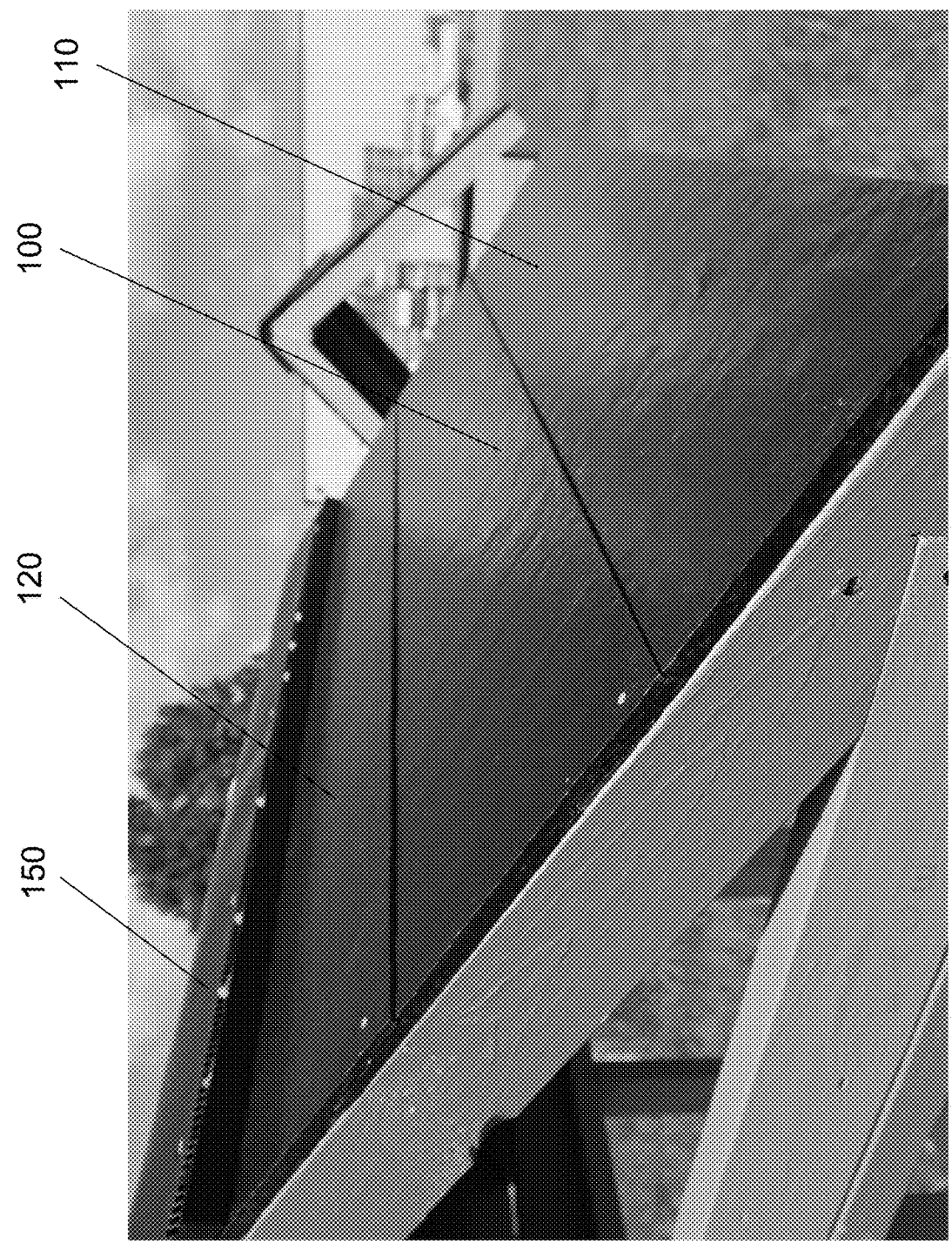
FIG. 11 shows a side view of an exemplary three-course roofing installation with shiplap joints, with a crown row, a standard row, and a starter row.

During installation, a course or row of "starter" roofing pieces 110 is affixed along the bottom edge of the roofing, with the underlap section on the top edge. A course of standard roofing pieces 100 is then applied, with the overlap section on the bottom edge overlaying the underlap section of the lower course to form a shiplap joint that is airtight and watertight. A number of standard roofing piece courses are then added in sequence up the roof to near the top, with the number determined by the size (height) of the roof. A course or row of "crown" roofing pieces 120 is then added as the final topmost course, with the overlap section on the bottom edge overlaying the underlap section of the lower course, as described above. FIG. 11 shows a simple three-course horizontal shiplap installation as an example.

The right and/or left ends of the plank/panel may be sealed with the WRB or a sealant. As discussed above, one form of sealant may be double-sided tape 28. Alternatively, an "end cap" may be applied to cover the ends.

Figure 13:
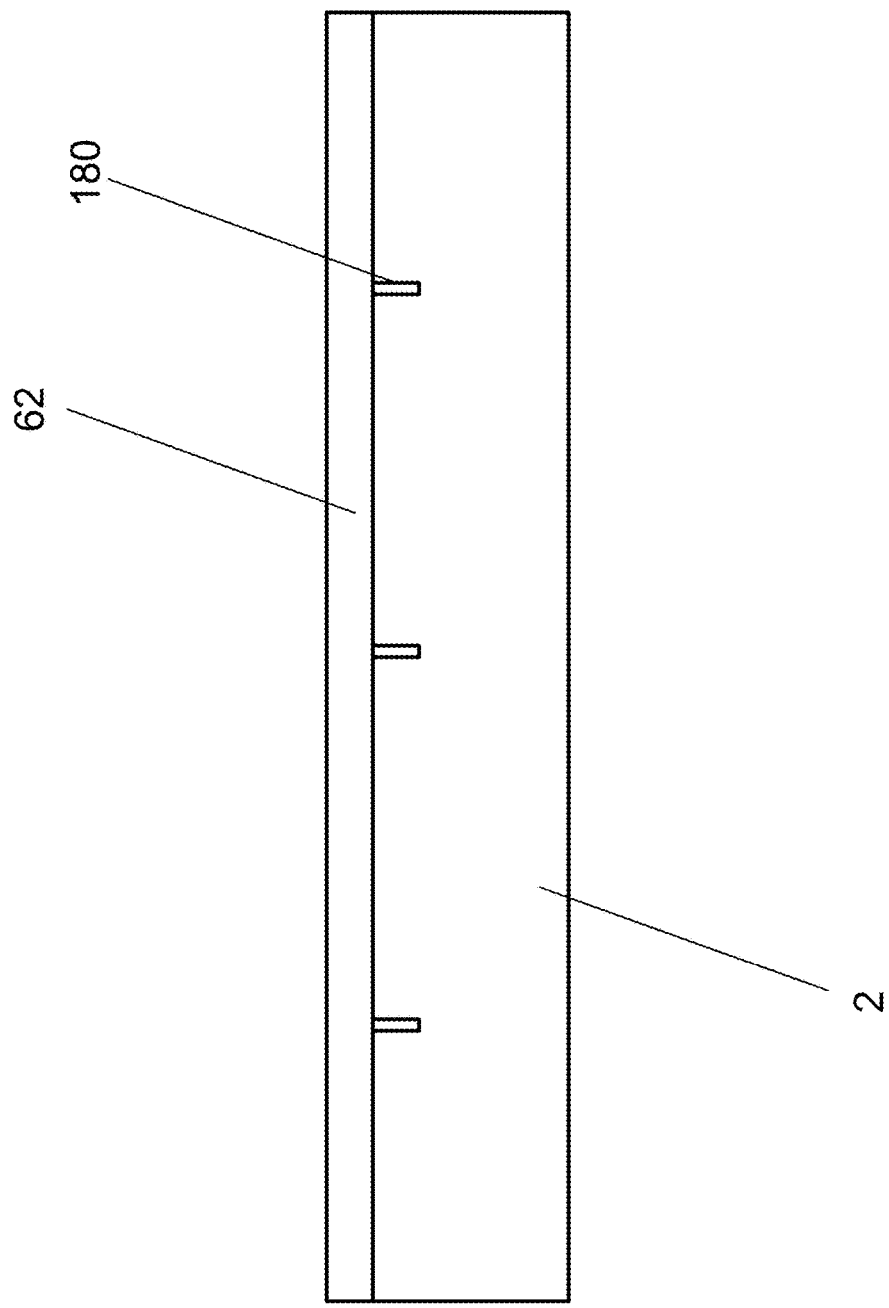
FIG. 13 shows a top view of a roofing plank or panel with drainage channels.

In several embodiments, as seen in FIGS. 13-14, one or more water evacuation channels or grooves 180 may extend from the shiplap lip proximate the upper edge of each plank/panel at least partway down the outer face. The interior of each channel is coated in a similar manner to the outer face. This allows water that may collect in the horizontal grooves formed by a horizontal shiplap installation to flow down and out of the horizontal grooves onto the outer face (i.e., onto the rooftop). In several embodiments, each channel has a variable depth, with the greatest depth at the shiplap lip (and equal to or approximately equal to the depth (i.e., height) of the lip, with the bottom of the channel then rising to the level of the outer face. The bottom may rise smoothly and gradually, to help promote the flow the water down the channel and out onto the face. The width of the channel should be sufficient to allow water flow down and out, and avoid a capillary effect, but not be so large as to substantially affect the structural integrity of the plank/panel.

The present invention applies the WRB and texturizing aggregate (either integrated or as separate layers) to the plank/panel at a manufacturing facility, prior to shipping or installation at a job site (and thereby avoiding the problems noted above with regard to prior art installations). In one embodiment, a fluid or liquid applied membrane is applied via one or more spray nozzles in a manufactured line process. The spray nozzle or nozzles are in fluid communication with one or more storage tanks, and the membrane liquid may be stored without the use of agitators. Nozzles apply the membrane coating at a constant pressure until reaching the desired wet film thickness. As the plank/panel travels down a secondary production line (typically on a form of conveyor belt), the WRB coating is sprayed on the top face, and in some embodiments, also the edges, of the plank/panel at a minimum thickness of 5-10 mils. If the coating is not sprayed on the edges, the edges are sealed by other means. The asphalt/adhesive and/or surface layers, if separate from each other and from the WRB layer, may be applied in a similar manner. In other embodiments, the WRB may be a solid layer (e.g., paper overlay), as seen in FIG. 6, that is applied during the panel manufacturing process.

In some embodiments, the present invention is produced through a curtain coating method. A storage tank containing the membrane liquid is positioned above the secondary production line. The tank has a longitudinal aperture that allows the membrane liquid to flow from the tank onto the plank/panel as it passes beneath the tank. The width of the aperture is adjusted so the amount of liquid flowing onto the plank/panel is the correct amount to achieve the desired wet film thickness of the coating.

Figure 12:
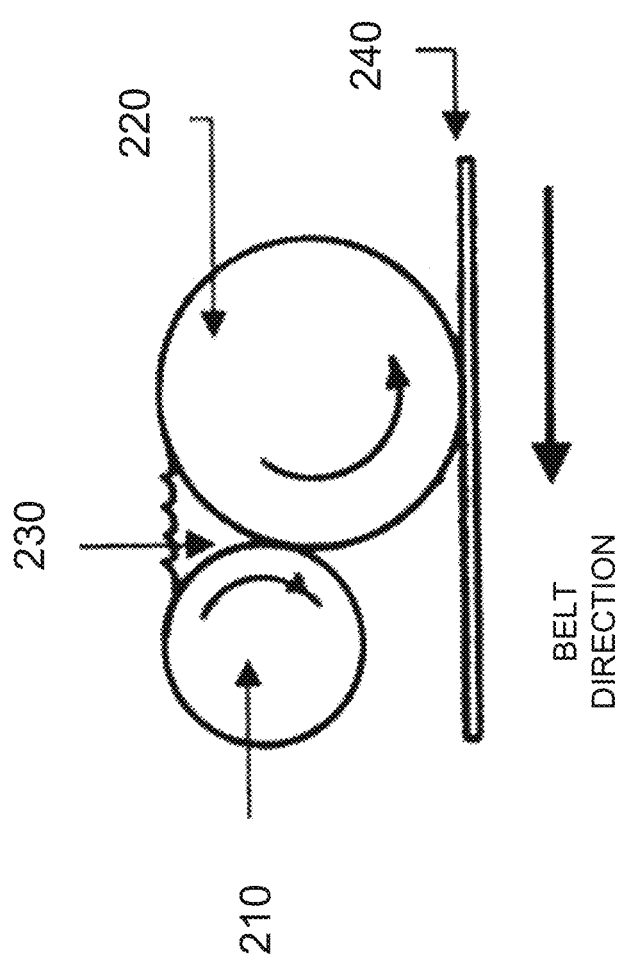
FIG. 12 shows a schematic of a roll coating method to produce the present invention.

In other embodiments, In some embodiments, the present invention is produced through a roll coating method. As seen in FIG. 12, two or more rolls (e.g., a doctor roll 210 and a coating roller 220) are positioned above the secondary production line. The membrane liquid (e.g., the polymer coating) 230 is located between the rolls, and passes between the rolls and is applied to the surface of the plank/panel 240 traveling on the line by the coating roller 220. The position of the doctor roll relative to the coating roller is adjusted to let pass the correct amount of liquid pass to achieve the desired wet film thickness of the coating.

In several embodiments, the texturizing surface and/or shingle layer may be one or more flexible rolls of material, and applied by unrolling the material across the plank/panel. The roll may have a self-adhesive layer on one side. In one embodiment, the shingle layer rolls may comprise one or more rolls of one-sided or two-sided construction tape (i.e., with strong, permanent adhesive on one or two sides). One side of the tape adheres to the panel, while the other side contains the shingle material. The tape may be applied to the panel at the factory, or otherwise prior to installation at the job site.

The present invention possesses several advantages over the prior art. It provides a superior barrier system that does not allow air movement between the plank/panel face and the applied WRB, and allows a savings in time and labor. Further, coating the panels in a controlled setting (e.g., manufacturing facility), allows the thickness of the coatings to be consistently applied, and allows the coating the opportunity to fully bond with the panel or adjacent layer. More specifically, the coatings can fully cure independent of weather conditions, and be applied without interference from construction-related dirt, debris or humidity. Further, the mineral granules or other texture-providing material may be included to increase the aesthetic appeal of the product, as well as to serve as a cooling agent in some cases, thereby enhancing energy efficiency.

Further, the WRB material also may provide an aesthetic effect, in appearance or texture, or both. The aesthetic effect may include color. In several embodiments, a double coating may be applied to provide a textured or aggregate-like appearance.

In a further embodiment, a radiant barrier layer 50 may be applied to the underside of the panel. Radiant barrier sheathing, typically used for roof and attic sheathing, has become a de facto standard in high solar radiation environments. Radiant barriers are installed in homes and structures, usually in attics, primarily to reduce summer heat gain and reduce cooling costs. The barriers consist of a highly reflective material that reflects radiant heat rather than absorbing it. Radiant heat travels in a straight line away from any surface and heats anything solid that absorbs its energy. Most common insulation materials address conductive and convective heat flow, not radiant heat flow. In contrast, a radiant barrier reduces the radiant heat transfer from the underside of the heated roofing materials to other surfaces in the attic, thereby reducing the cooling load of the house.

A layer of aluminum (typically aluminum foil) is commonly used as the reflective material, as it is efficient at not transmitting radiant energy into the attic environment. The aluminum foil used in radiant barriers must be very pure to achieve a low emittance surface. The thickness of the aluminum does not affect performance; the aluminum only needs to cover the surface of the sheathing material. Typically, very thin foils (approximately 0.00025 inches thick) are used. As this foil is too thin (and thus too fragile) to be applied to wood structural panels directly, it may be attached and bonded to another substrate, most often Kraft paper, for support. The combined overlay is then laminated to one side of a wood structural panel face to make the radiant barrier sheathing. As an alternative to foil, a very thin layer of aluminum (or similar metal) can be deposited via vapor deposition manufacturing processes onto a polyethylene sheet (PET) to form a metallized PET sheet. Like foil, the metallized PET sheet can be laminated to Kraft paper, and the combined overlay is laminated to one side of a wood structural panel face to make the radiant barrier sheathing.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An integrated roofing product, comprising:
   a multilayered, integrated roofing panel or plank, comprising:
      a base layer comprising an engineered wood sheathing panel, the base layer comprising an outer face, a top edge, a bottom edge, a left edge, and a right edge, wherein at least one of the top edge and the bottom edge comprise an overlap portion or underlap portion of a shiplap joint;
      a water resistant barrier layer covering at least the outer face of the base layer, and at least one of the edges; and
      a roof surface layer affixed to or forming a surface of the water resistant barrier layer, said roof surface layer further comprising a texturizing material;
   wherein the integrated roofing product is configured as one multi-layer panel product combining a structural sheathing panel, a water resistant barrier, and a roof surface layer that eliminates separate sequential application during installation thereof;
   wherein the upper edge comprises the underlap portion of said shiplap joint;
   wherein the underlap portion comprises an underlap joint face parallel to the outer face with an underlap lip orthogonal to the underlap joint face extending between the underlap joint face and the outer face; and
   further comprising one or more water evacuation channels extending from the underlap lip partway down the outer face towards the bottom edge, each of said one or more water evacuation channels having a gradually decreasing depth, with the greatest depth at the underlap lip.

2. The product of claim 1, wherein the roof surface layer and texturizing material are integrated with the water resistant barrier layer.

3. The product of claim 1, wherein the water resistant barrier layer covers the top edge and the bottom edge.

4. The product of claim 1, wherein the water resistant barrier layer covers the right edge and left edge.

5. The product of claim 1, wherein the upper edge comprises the underlap portion of said shiplap joint.

6. The product of claim 1, wherein the bottom edge comprises the overlap portion of said shiplap joint.

7. The product of claim 1, wherein the upper edge comprises the underlap portion of said shiplap joint, and the bottom edge comprises the overlap portion of said shiplap joint.

8. The product of claim 5, wherein the underlap portion comprises an underlap joint face parallel to the outer face, and the underlap joint face is covered at least in part by the water resistant barrier layer.

9. The product of claim 6, wherein the overlap portion comprises an overlap joint face parallel to the outer face, and the overlap joint face is covered at least in part by the water resistant barrier layer.

10. The product of claim 1, wherein the water resistant barrier layer comprises a polymer.

11. The product of claim 1, wherein the texturizing material comprises ceramic coated granules, rock, glass, or slate.

12. The product of claim 1, wherein the texturizing material comprises rubber, plastic, or a synthetic polymer.

13. The product of claim 1, further comprising a radiant barrier layer affixed to an inner face of the base layer.

14. The product of claim 1, wherein the product is configured as a starter roofing piece, wherein the upper edge comprises the underlap portion of said shiplap joint, and the bottom edge comprises a square or butt end.

15. The product of claim 1, wherein the product is configured as a crown roofing piece, wherein the upper edge comprises a square or butt end, and the bottom edge comprises and the overlap portion of said shiplap joint.

16. The product of claim 5, wherein the underlap portion comprises an underlap joint face parallel to the outer face, and the underlap joint face is covered at least in part by a sealant.

17. The product of claim 6, wherein the overlap portion comprises an overlap joint face parallel to the outer face, and the overlap joint face is covered at least in part by a sealant.

18. The product of claim 16, wherein the sealant is double-sided tape.

19. The product of claim 1, wherein the right end and left end are covered by a sealant or end-caps.

* * * * *